No. 884,599. PATENTED APR. 14, 1908.
D. E. MILES.
CATTLE STANCHION.
APPLICATION FILED JULY 12, 1906.
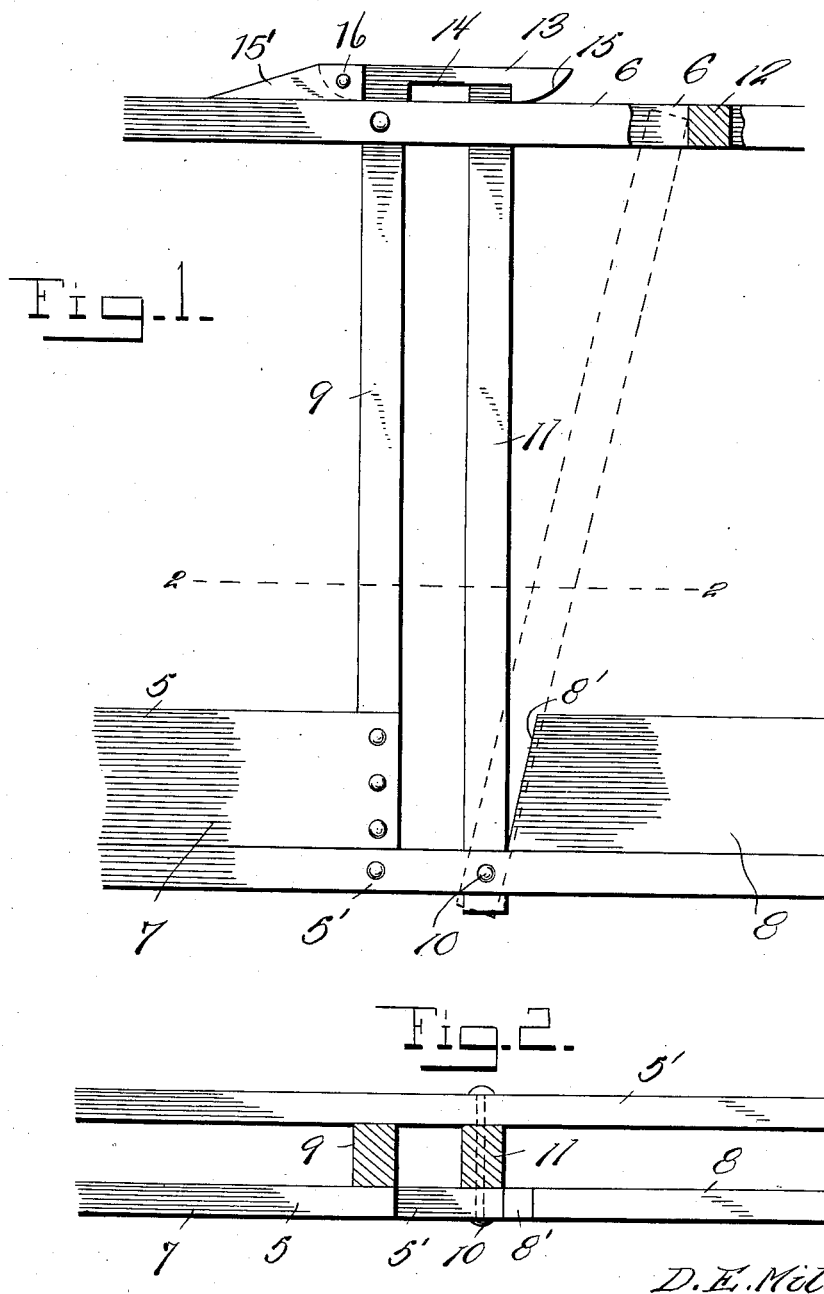

UNITED STATES PATENT OFFICE.

DAVID E. MILES, OF REECE, KANSAS.

CATTLE-STANCHION.

No. 884,599.

Specification of Letters Patent.

Patented April 14, 1908.

Application filed July 12, 1906. Serial No. 325,955.

*To all whom it may concern:*

Be it known that I, DAVID E. MILES, a citizen of the United States, residing at Reece, in the county of Greenwood, State of Kansas, have invented certain new and useful Improvements in Cattle-Stanchions; and I do hereby declare the following to be a full, clear, and exact description of the invention, such as will enable others skilled in the art to which it appertains to make and use the same.

This invention relates to cow stanchions and has for its object to provide a device of this nature which, in coöperation with a specific construction of trough also embodied in my invention, will permit greater freedom of movement of the head of the animal than is obtained by the use of the present forms of stanchions and will permit the animal to lie down.

In carrying out my invention I employ a pair of lower parallel beams, above which are a second pair of parallel beams and in connection with which I use a trough, and a fixed and a latch-held swinging stanchion, as will be described more fully hereinafter.

In the accompanying drawings, Figure 1 is a front elevation of the device showing in full lines the pivoted stanchion bar in latched position and in unlatched position in dotted lines, and, Fig. 2 is a horizontal sectional view on the line 2—2 of Fig. 1.

Referring more specifically to the drawings the numeral 5 denotes the front wall of a feed trough and 5' a pair of spaced parallel beams upon the forward one of which the wall is supported. The numeral 6 indicates a similar pair of beams which are located above the beams 5' and extend in parallel relation thereto, the said beams being supported in a stable or shed (not shown) in which the trough is located. The said wall of the trough in front is cut-away or in other words is formed in two sections one of which is indicated by the numeral 7 and the other by the numeral 8, the end edges of the sections being opposed. The end edge of the section 7 is vertical whereas the edge 8' of the section 8 is inclined and recedes vertically from the plane of the vertical edge of the section 7 for a purpose to be hereinafter described.

Secured to the rear face of the section 7 at the end thereof adjacent the section 8 is the lower end of a fixed stanchion bar 9 this bar being flush with the said edge of the section 7 and being fixed at its upper end between the upper pair of beams 6, and at its lower end between the pair of beams 5', 5' as shown in Fig. 2. Pivoted at its lower end upon a horizontally held bolt 10 between the beams 5' at the lower end of the end edge 8' of the section 8 is a swinging or movable stanchion bar 11 which has its upper end received between the beams 6 and is arranged for swinging movement in a line with the said beams as will be readily understood. A stop block 12 is secured between the beams 6 at such a point that when the bar 11 has been swung to a plane corresponding to the inclined plane determined by the end 8' of the section 8 further movement thereof will be prevented and it will be understood from this that if the cow attempts to move her head directly from the trough sufficient room will be afforded her. In order that the bar 11 may be held in a vertical position to prevent the cow leaving her stall until so desired, a gravity latch 13 is pivoted above to a bracket 15' by means of a pin 16, this bracket being secured to one of the forward beams 6 and is notched as at 14 in its under face and beveled from its said notch to its free end as at 15, it being understood that as the bar 11 is swung to engage with the said beveled face of the said latch, the latch will be raised to permit the upper end of the bar to seat in the notch 14.

What is claimed is—

In a cattle stanchion the combination with a pair of lower spaced parallel beams, of a second pair of spaced parallel beams directly above said first mentioned set and extending parallel therewith, a trough section having a vertical end edge, a second trough section having an opposed inclined end edge, said trough sections being secured to one of said lower beams, a fixed stanchion bar secured to the rear face of said first mentioned trough section, one of its vertical edges being flush with the end edge of said trough section, said stanchion at its lower end being secured between said first mentioned set of beams and at its upper end between said second pair of beams, a bolt passing horizontally through said lower spaced beams and located near the lower edge of said trough section having an inclined end edge, a swinging stanchion pivotally held upon said bolt and between said lower pair of beams, the upper end of said stanchion swinging between said upper parallel beams, a stop block positioned between said upper beams, a bracket secured to one of said upper beams, a pin carried by said bracket, and a gravity latch carried by said pin and adapted to hook over the upper end of said swinging stanchion in the manner shown.

In testimony whereof, I affix my signature, in presence of two witnesses.

DAVID E. MILES.

Witnesses:
   JOEL GRAVES,
   LILLIE F. GRAVES.